United States Patent
Nishie et al.

(10) Patent No.: US 7,254,300 B2
(45) Date of Patent: Aug. 7, 2007

(54) OPTICAL MODULE AND MOUNTING COMPONENT

(75) Inventors: Mitsuaki Nishie, Yokohama (JP); Yoshiki Kuhara, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 185 days.

(21) Appl. No.: 10/861,755

(22) Filed: Jun. 4, 2004

(65) Prior Publication Data

US 2005/0013555 A1    Jan. 20, 2005

(30) Foreign Application Priority Data

Jun. 11, 2003    (JP)    ............................. 2003-167051

(51) Int. Cl.
*G02B 6/30*    (2006.01)
(52) U.S. Cl. ............................. 385/49; 385/88; 385/90; 385/91
(58) Field of Classification Search .................. 385/88, 385/90–94, 83, 80, 137, 27, 31, 39, 49, 76, 385/14, 53; 216/24; 156/292
See application file for complete search history.

(56) References Cited

U.S. PATENT DOCUMENTS

| | | | | |
|---|---|---|---|---|
| 630,913 | A * | 8/1899 | Myers | 384/537 |
| 4,181,400 | A * | 1/1980 | Malsot et al. | 385/83 |
| 5,896,481 | A * | 4/1999 | Beranek et al. | 385/90 |
| 5,972,232 | A * | 10/1999 | Lee et al. | 216/24 |
| 5,985,086 | A * | 11/1999 | Peall | 156/292 |
| 6,181,854 | B1 * | 1/2001 | Kojima et al. | 385/49 |
| 6,263,137 | B1 * | 7/2001 | Yoneyama et al. | 385/49 |
| 6,293,711 | B1 * | 9/2001 | Sasaki | 385/88 |
| 6,309,113 | B1 * | 10/2001 | Naito | 385/88 |
| 6,377,742 | B1 * | 4/2002 | Go | 385/134 |
| 6,467,972 | B2 * | 10/2002 | Setoguchi | 385/88 |
| 6,477,284 | B1 * | 11/2002 | Oda et al. | 385/14 |
| 6,516,131 | B1 * | 2/2003 | Tullis | 385/137 |
| 6,529,650 | B1 * | 3/2003 | Tsuru | 385/14 |
| 6,535,685 | B1 * | 3/2003 | Tullis | 385/137 |
| 6,550,981 | B1 * | 4/2003 | Yamauchi | 385/88 |
| 6,553,173 | B1 * | 4/2003 | Goto | 385/137 |
| 2002/0025123 | A1 * | 2/2002 | Fujimura et al. | 385/88 |
| 2003/0095756 | A1 * | 5/2003 | Tohgoh et al. | 385/88 |

FOREIGN PATENT DOCUMENTS

JP    9-33765    2/1997

* cited by examiner

*Primary Examiner*—Brian Healy
*Assistant Examiner*—Guy G. Anderson
(74) *Attorney, Agent, or Firm*—Fish & Richardson P.C.

(57) ABSTRACT

An optical module includes a semiconductor optical device, an optical fiber, a ferrule, and a mounting component. The optical fiber is optically coupled to the semiconductor optical device. The ferrule holds the optical fiber. The mounting component includes a first support groove for supporting the ferrule and a second support groove for supporting the optical fiber. The semiconductor optical device is mounted on the mounting component. The first and second support grooves are sequentially arranged in a direction of a predetermined axis. The second support groove has one end and the other end. The depth of the second support groove decreases from the one end toward the other end. With such a structure, the optical module allows the optical fiber to be positioned with high accuracy onto the mounting component.

7 Claims, 11 Drawing Sheets

OPTICAL MODULE AND MOUNTING COMPONENT

BACKGROUND OF THE INVENTION

1. Field of the Invention

The present invention relates to an optical module, and particularly to a mounting component thereof.

2. Description of the Related Art

An example of an optical module as a conventional technique of optical modules is disclosed in Japanese Unexamined Patent Application Publication No. 9-33765. In this optical module, a groove for mounting an optical fiber and two grooves for mounting a guide pin are formed in a central portion of a substrate by anisotropic etching of Si, and an optical device is arranged on a marker for mounting an optical device, and fixed with solder. The optical fiber is placed in alignment with a fiber mounting groove on the substrate and fixed with a resin and an optical fiber holder having an optical fiber holding groove, and guide pins are placed in alignment with the guide pin mounting grooves on the substrate and fixed with a resin and a cap having a fiber-holder fitting groove and guide pin holding grooves.

In the optical module described in Japanese Unexamined Patent Application Publication No. 9-33765, the optical fiber is fixed on the substrate by means of an adhesive resin and the optical fiber holder having an optical fiber holding groove. It is necessary to form the optical fiber holding groove on the optical fiber holder with comparatively high accuracy.

When the optical fiber holder is placed on the optical fiber that is disposed at an aligned position on the substrate, the optical fiber holder may happen to apply a force to the optical fiber such that the optical fiber is displaced.

SUMMARY OF THE INVENTION

It is an object of the present invention to provide an optical module capable of positioning an optical fiber on a mounting component with higher accuracy.

In accordance with one aspect of the present invention, an optical module includes (a) a semiconductor optical device; (b) an optical fiber optically coupled to the semiconductor optical device; (c) a ferrule for holding the optical fiber; and (d) a mounting component for mounting the semiconductor optical device and having a first support groove for supporting the ferrule and a second support groove for supporting the optical fiber, (e) wherein the first and second support grooves are arranged in a direction of a predetermined axis, the second support groove has one end and the other end, and a depth of the second support groove decreases from the one end toward the other end.

In the optical module, the optical fiber is settled in the second support groove since the second support groove has a depth decreasing from one end toward the other end.

In the optical module, the second support groove may have first and second sides, both extending in the direction of a predetermined axis, for supporting the optical fiber such that the optical fiber is supported by a first support portion on the first side and a second support portion on the second side, wherein the space between the first support portion and the second support portion at a first position on the predetermined axis may be smaller than the space between the first support portion and the second support portion at a second position on the predetermined axis while the distance between the first position and the one end of the second support groove may be greater than the distance between the second position and the one end of the second support groove.

In the optical module, the optical fiber is settled in the second support groove since the space between the first support portion and the second support portion at the first position is smaller than the space between the first support portion and the second support portion at the second position.

In an optical module according to the present invention, the mounting component may include a principal plane extending along a predetermined plane, the first support groove being provided on the principal plane such that the optical fiber is provided with a portion inclined to the predetermined plane and extending along a substantially straight line in the second support groove.

In the optical module, the optical fiber is settled in the second support groove while being inclined along the second support groove.

In an optical module according to the present invention, the gradient angle of the inclined portion can be in the range of 4° to 12°.

If the gradient angle of the second support groove is less than 4°, a sufficient advantage of the inclination is not exhibited to the optical fiber. If the gradient angle of the second support groove exceeds 12°, the optical fiber bends excessively.

In an optical module according to the present invention, the mounting component may include a principal plane extending along a predetermined plane, the first support groove being provided on the principal plane such that the optical fiber is provided with a portion inclined to the predetermined plane and extending along a convex curve in the second support groove.

According to such structure of the optical module, part of the optical fiber is settled along a convex curve in the second support groove.

In an optical module according to the present invention, the portion of the optical fiber may extend along a substantially circular arc.

In the optical module, the part of the optical fiber is settled along a substantially circular arc in the second support groove.

The optical module according to the present invention may further include a resin body for fixing the optical fiber to the mounting component.

In the optical module, the optical fiber is fixed with the resin body to the mounting component in a state in which the optical fiber is settled in the second support groove.

In the optical module according to the present invention, the mounting component may be made of silicon. In the case of a silicon mounting component, the first and second support grooves can be formed by etching.

In the optical module according to the present invention, the mounting component may be made of ceramics. In the case of a ceramics mounting component, the capacitance thereof is low.

In the optical module according to the present invention, the mounting component may be made of a resin. In the case of a resin mounting component, the second support groove can be formed according to the shape of a forming die.

The semiconductor optical device in an optical module according to the present invention may be a semiconductor light emitting device or a semiconductor light receiving device. With such an optical module, an optical transmission module or an optical receiver module can be obtained accordingly.

In an optical module according to the present invention, the semiconductor optical device may be a rear-illuminated type semiconductor light receiving device, and the mounting component may further include a mounting region for mounting the semiconductor light receiving device, and a reflection face for reflecting light from the optical fiber may be provided in the mounting region. Since the light-receiving diameter of the rear-illuminated type semiconductor light receiving device is large, more amount of light can be received from the inclining optical fiber.

In accordance with another aspect of the present invention, a mounting component for mounting an optical fiber held in a ferrule includes (a) a principal plane having first and second areas; (b) a mounting portion for mounting a semiconductor optical device optically coupled to the optical fiber, the mounting portion being provided in the first area of the principal plane; and (c) a second support groove for supporting the optical fiber, the second support groove having one end and the other end and provided in the second area of the principal plane, wherein the depth of the second support groove decreases from the one end toward the other end.

The mounting component is advantageous for settling the optical fiber in the second support groove, since the depth of the second support groove decreases from the one end toward the other end.

The mounting component according to the present invention may be structured such that the principal plane thereof includes a third area, and the second area is provided between the first area and the third area, and the third area is provided with a first support groove for supporting the ferrule. According to such structure of the mounting component, a groove for supporting a ferrule can be provided.

As described above, according to the present invention, an optical module capable of positioning an optical fiber in a mounting component with higher accuracy can be provided.

Other objects, features, and advantages of the present invention will be more easily apparent from the following detailed preferred embodiments with reference to the drawings.

DESCRIPTION OF THE PREFERRED EMBODIMENTS

Figure 1:
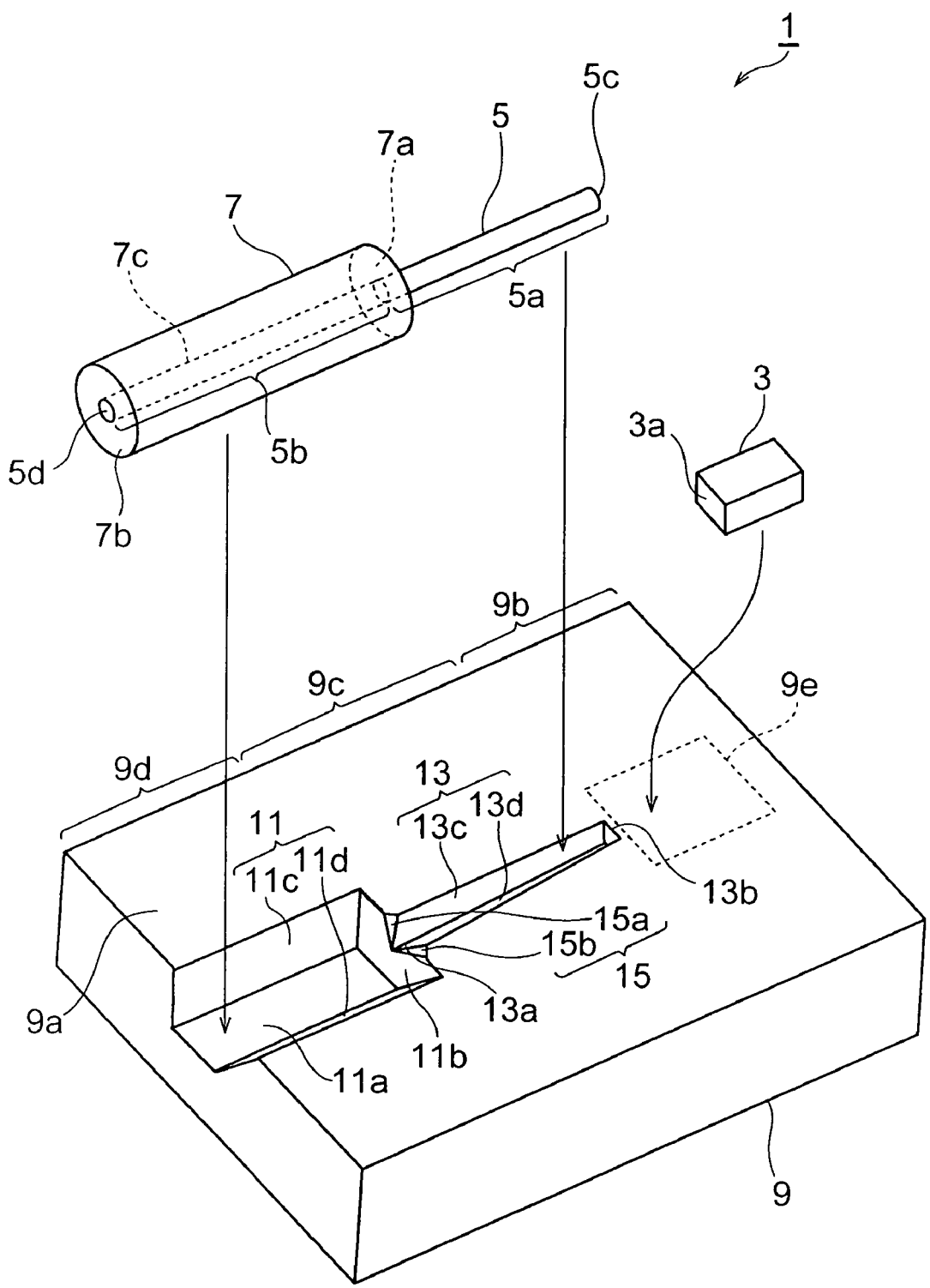
FIG. 1 is a drawing showing components of an optical module according to a first embodiment.

The present invention will be easily understood by taking the following detailed description into consideration with reference to the attached drawings shown as exemplifications. Then, embodiments of a manufacturing method of a semiconductor device according to the present invention will be described referring to the attached drawings. Like reference numerals may designate like components.

First Embodiment

FIG. 1 is a drawing showing components of an optical module according to a first embodiment; FIG. 2(A) is a sectional view of a mounting component taken along the line 1-1 of FIG. 2(C); FIG. 2(B) is a sectional view of the optical module taken along the line 1-1 of FIG. 2(C); and FIG. 2(C) is a plan view of the optical module.

An optical module 1 includes a semiconductor optical device 3, an optical fiber 5, a ferrule 7, and a mounting component 9. The optical fiber 5 is optically coupled to the semiconductor optical device 3. The ferrule 7 retains the optical fiber 5. The mounting component 9 includes a first support groove 11 for supporting the ferrule 7 and a second support groove 13 for supporting the optical fiber 5. The mounting component 9 mounts the semiconductor optical device 3 thereon. The first and second support grooves 11 and 13 are arranged in order in the direction of a predetermined axis. The second support groove 13 includes one end 13a and the other end 13b. The second support groove 13 has a depth decreasing from the one end 13a toward the other end 13b.

According to such structure of the optical module 1, a reactive force is applied from the second support groove 13 to the optical fiber 5 disposed in the groove since the depth of the second support groove 13 decreases from the one end 13a toward the other end 13b. By this force, the optical fiber 5 is firmly settled in the second support groove 13 such that the optical fiber 5 extends along the second support groove 13 without using a fixing member, such as a glass plate, that may otherwise be needed for fixing the optical fiber to the mounting component. Since no fixing member is used in the optical module, positioning of an optical fiber to a mounting component can be achieved with higher accuracy.

The optical fiber 5 has a first portion 5a and a second portion 5b. The ferrule 7 has a through-hole 7c extending from one end face 7a to the other end face 7b and retains the second portion 5b of the optical fiber 5 therein. The optical fiber 5 has one end 5c and the other end 5d, and the one end 5c is optically coupled to one end face 3a of the semiconductor optical device 3. The other end face 5d of the optical fiber 5 is exposed at the other end face 7b of the ferrule 7.

The mounting component 9 mounts the optical fiber 5 retained by the ferrule 7 and the semiconductor optical device 3 thereon. The mounting component 9 has a principal plane 9a including first to third areas 9b, 9c, and 9d. The first area 9b of the principal plane 9a has a mounting region 9e for mounting the semiconductor optical device 3 optically coupled to the optical fiber 5. The second support groove 13 for supporting the optical fiber 5 is formed on the second area 9c of the principal plane 9a, while the first support groove 11 for supporting the ferrule 7 is formed on the third area 9d of the principal plane 9a.

The first support groove 11 includes first and second sides 11c and 11d for supporting ferrule 7, while the second support groove 13 includes first and second sides 13c and 13d for supporting the optical fiber 5. The other end 11b of the first support groove 11 is connected to the one end 13a of the second support groove 13. A chamfered section 15 is formed between the first support groove 11 and the second support groove 13. The chamfered section 15 includes inclined planes 15a and 15b. The inclined planes 15a and 15b are continuous, respectively from the two sides 13c and 13d of the second support groove 13, to one end face 11b of the first support groove 11. The depth of the second support groove 13 decreases from the one end 13a toward the other end 13b. As shown in FIG. 2(A), the first support groove 11 has a depth $D_0$, for example. A depth $D_A$ at the one end 13a of the second support groove 13 is larger than a depth $D_B$ at the other end 13b. The second support groove 13 is inclined at an angle 'a' relative to the principal plane 9a of the mounting component 9.

Referring to FIG. 2(B), the optical axis of the second portion 5b of the optical fiber 5 extends along a reference axis $A_x$ in the ferrule 7. In the first portion 5a of the optical fiber 5, the interval between the optical axis of the first portion 5a of the optical fiber 5 and the reference axis $A_x$ is larger at a first position $P_1$ than at a second position $P_2$. On the reference axis $A_x$, the distance between the one end 13a of the second support groove 13 and the first position $P_1$ is larger than the distance between the one end 13a of the second support groove 13 and the second position $P_2$.

The first portion 5a of the optical fiber 5 is inclined along the second support groove 13 so as to form an angle 'a' to the principal plane 9a of the mounting component 9. The end 5c of the optical fiber 5 has a face extending along a reference plane $S_1$. An end face 3a of the semiconductor optical device 3 extends along a reference plane S2. The reference plane S1 is inclined relative to the reference plane S2. Because of such inclination, light reflected at the face of the end 5c of the optical fiber 5 does not return to the semiconductor optical device 3.

In the optical module 1, the second portion 5b of the optical fiber 5 extends substantially along a straight line, while the first portion 5a of the optical fiber 5 is inclined along the second support groove 13 so as to be settled in the second support groove 13. The angle of such inclination may be in the range of 4° to 12°. If the angle of gradient of the second support groove is less than 4°, the optical fiber does not have the sufficient advantage of the inclination. If the angle of gradient of the second support groove exceeds 12°, the bending of the optical fiber is excessively large. When the length of the second support groove 13 is about 4 mm, the height of the optical fiber 5 at the one end 5c approximately ranges from 280 μm to 850 μm. The inclination of the first portion 5a of the optical fiber 5 causes the end face of the one end 5c of the optical fiber 5 to incline.

Referring to FIGS. 2(B) and 2(C), the optical module 1 may further include a resin body 17a for fixing the optical fiber 5 to the mounting component 9. In a state in which the optical fiber 5 is settled in the second support groove 13, the optical fiber 5 is fixed to the mounting component 9 with the resin body 17a. The optical module 1 may further include a resin body 17b for fixing the ferrule 7 to the mounting component 9. In a state in which the ferrule 7 is settled in the first support groove 11, the ferrule 7 is fixed to the mounting component 9 with the resin body 17b. The resin body 17a is provided in the second area while the resin body 17b is provided in the third area.

Referring to FIG. 2(C), in the optical module 1, the space between the first side 13c and the second side 13d at the first position $P_1$ is smaller than that at the second position $P_2$. Thereby, in the mounting component 9, the depth of the second support groove 13 changes.

In the optical module 1, the mounting component 9 may be made of silicon. In the silicon mounting component 9, the first and second support grooves 11 and 13 are formed by etching. The mounting component 9 may also be made of ceramics. In the case of a ceramic mounting component 9, the capacitance thereof is low. Furthermore, the mounting component 9 may be made of a resin. In the case of a resin mounting component 9, the second support groove can be made according to the shape of a forming die. An epoxy resin and a liquid crystal polymer resin may be used as the resin material, for example.

In the optical module 1, the semiconductor optical device 3 may be either a semiconductor light emitting device or a semiconductor light receiving device. The semiconductor light emitting device may be a semiconductor laser, a light emitting diode, a semiconductor optical amplifier, or a semiconductor optical modulator, for example. The semiconductor light receiving device may be a photodiode, for example.

Figure 2:
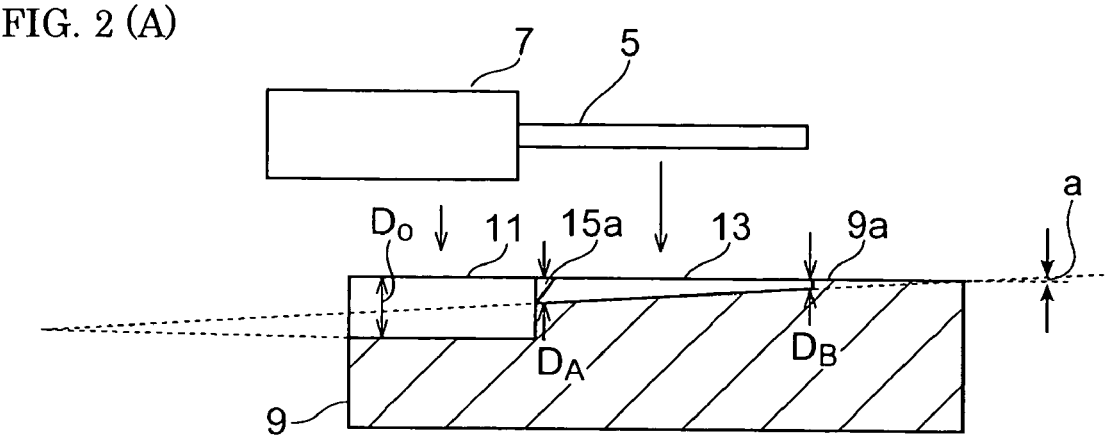
FIG. 2(A) is a sectional view of a mounting component taken along the line I-I of FIG. 2(C)
FIG. 2(B) is a sectional view of an optical module taken along the line I-I of FIG. 2(C)
FIG. 2(C) is a plan view of the optical module.
Figure 2:
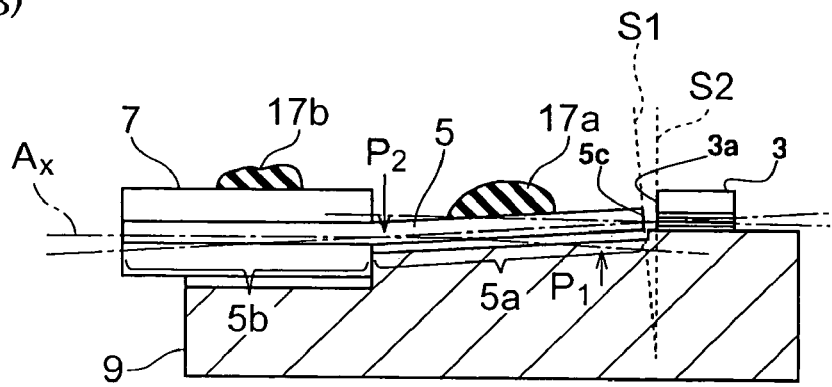
Figure 2:
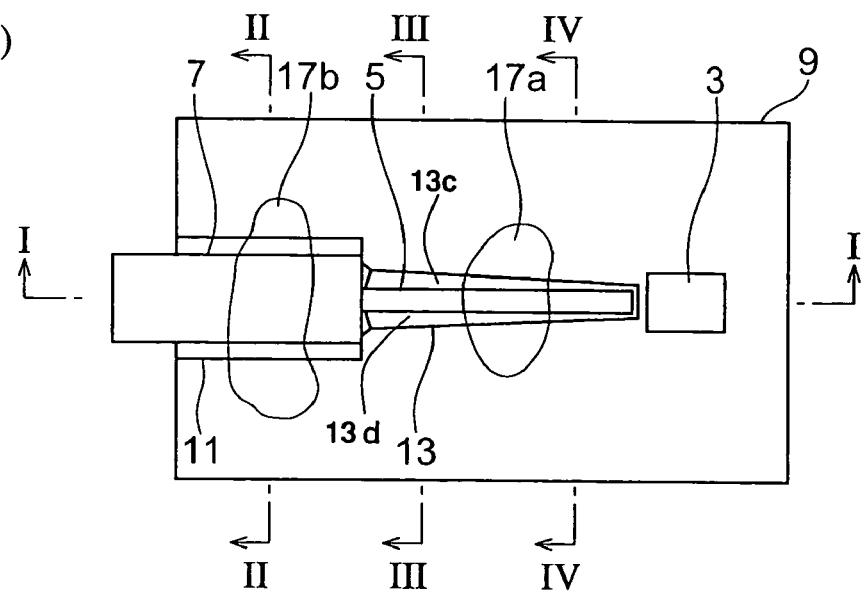
Figure 3:
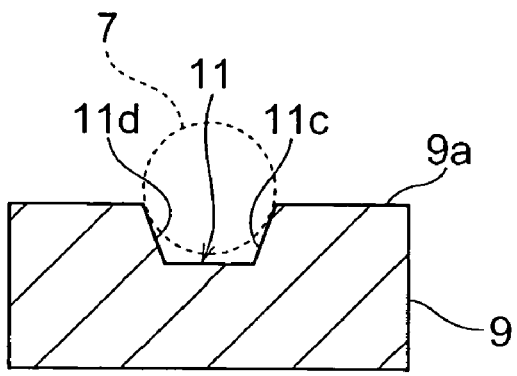
FIG. 3(A) is a sectional view of a first support groove taken along the line II-II of FIG. 2(C)
FIG. 3(B) is a sectional view of a second support groove taken along the line III-III of FIG. 2(C)
FIG. 3(C) is a sectional view of the second support groove taken along the line IV-IV of FIG. 2(C)
FIG. 3(D) is a plan view of the mounting component.
Figure 3:
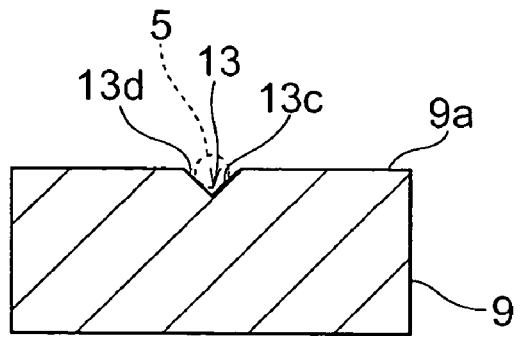
Figure 3:
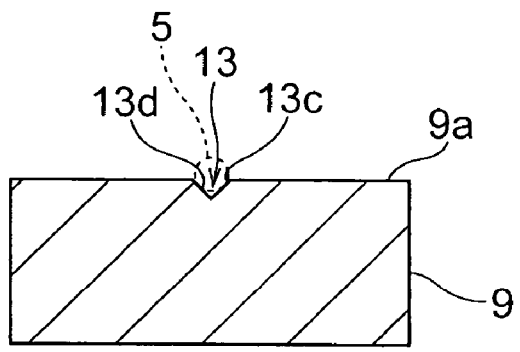
Figure 3:
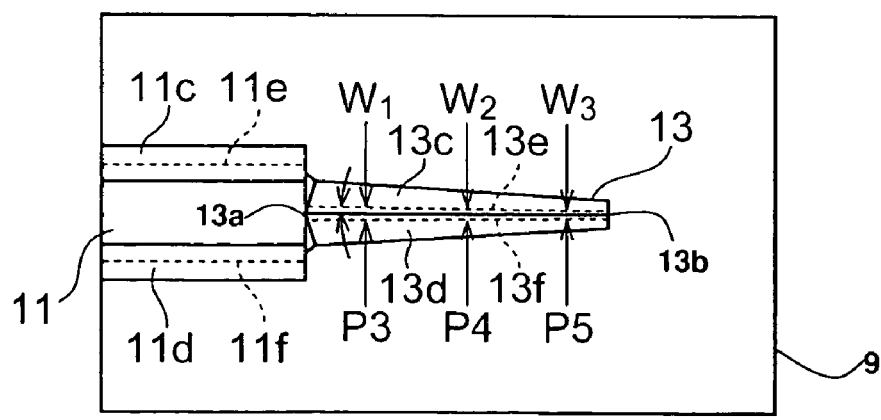

FIG. 3(A) is a sectional view of the first support groove taken along the line II-II of FIG. 2. FIG. 3(B) is a sectional view of the second support groove taken along the line III-III of FIG. 2(C). FIG. 3(C) is a sectional view of the second support groove taken along the line IV-IV of FIG. 2(C). FIG. 3(D) is a plan view of the mounting component.

The first support groove 11 of the mounting component 9 has the first and second sides 11c and 11d, and as shown in FIG. 3(A), has a trapezoid section. The second support groove 13 has the first and second sides 13c and 13d, and as shown in FIGS. 13(B) and 13(C), has a V-shaped section. Referring to FIGS. 13(B) and 13(C), the depth of the second support groove 13 decreases from the one end 13a towards the other end 13b.

Referring to FIG. 3(D), in the first support groove 11, the ferrule 7 is supported on a first support portion 11e (shown by a broken line) of the first side 11c, while supported on a second support portion 11f (shown by a broken line) of the second side 11d. In the second support groove 13, the optical fiber 5 is supported on a first support portion 13e (shown by a broken line) of the first side 13c, while supported on a second support portion 13f (shown by a broken line) of the second side 13d.

First to third positions P3, P4, and P5 on a predetermined axis are shown in FIG. 3(D). The spaces between a first support portion and a second support portion are shown by symbol $W_1$, $W_2$, and $W_3$, at the first position P3, the second position P4, and the third position P5, respectively. According to the first embodiment, the space $W_1$ is larger than the space $W_2$, and the space $W_2$ is larger than the space $W_3$. By this structure, the depth of the second support groove 13 decreases from the one end 13a toward the other end 13b. In this optical module, as the first and second support portions 13e and 13f for supporting the optical fiber 5 are distanced from the one end 13a of the support groove 13, the space between the first and second support portions 13e and 13f becomes smaller, and thereby the optical fiber 5 can be settled in the second support groove.

As described above, with such structure of the optical module 1, the positioning of an optical fiber in a mounting component can be achieved with higher accuracy.

Figure 4:
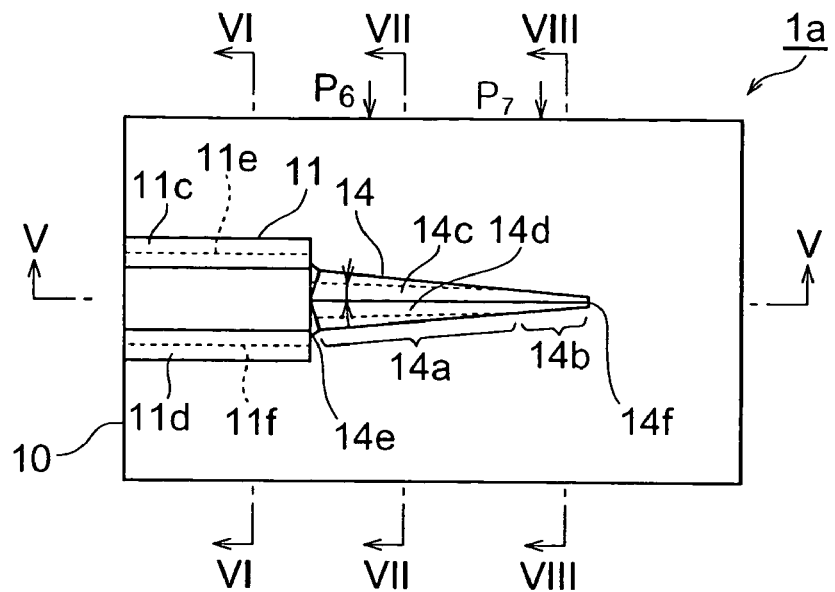
FIG. 4(A) is a plan view showing a modification of the mounting component.
FIG. 4(B) is a plan view showing a modification of the optical module.
FIG. 4(C) is a sectional view of the optical module taken along the line V'-V' of FIG. 4(B)
Figure 4:
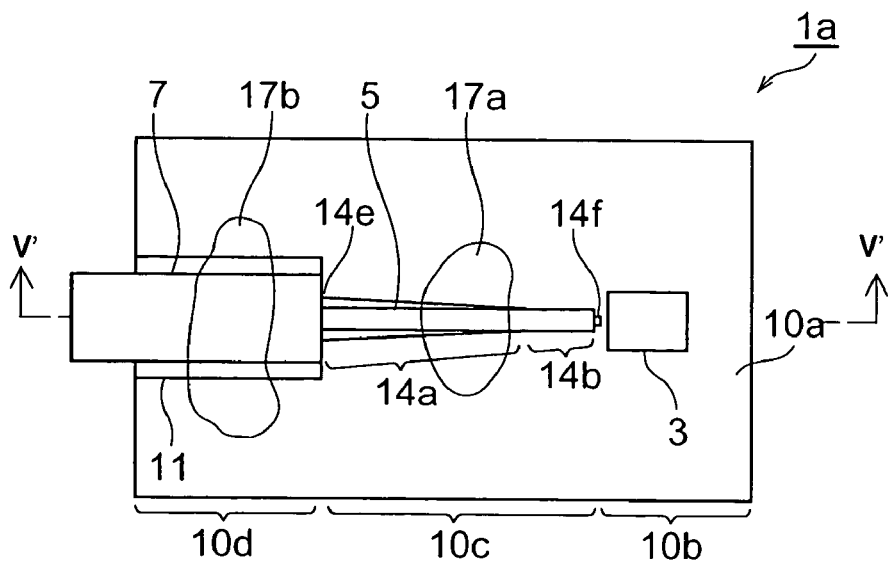
Figure 4:
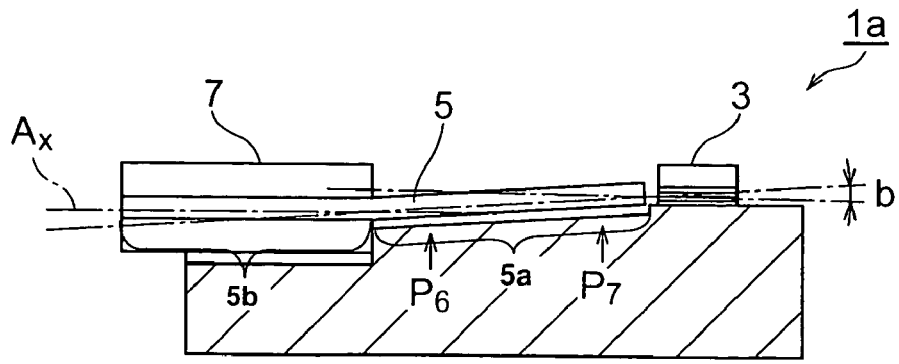
Figure 5:
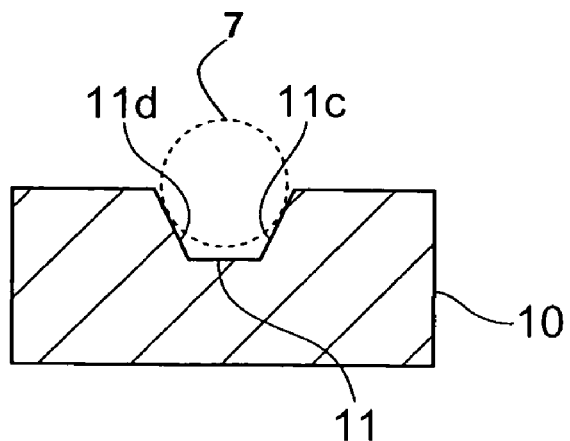
FIG. 5(A) is a sectional view of a first support groove taken along the line VI-VI of FIG. 4(A)
FIG. 5(B) is a sectional view of the second support groove taken along the line VII-VII of FIG. 4(A)
FIG. 5(C) is a sectional view of the second support groove taken along the line VIII-VIII of FIG. 4(A)
FIG. 5(D) is a drawing showing an enlarged section of the second support groove shown in FIG. 5(C)
Figure 5:
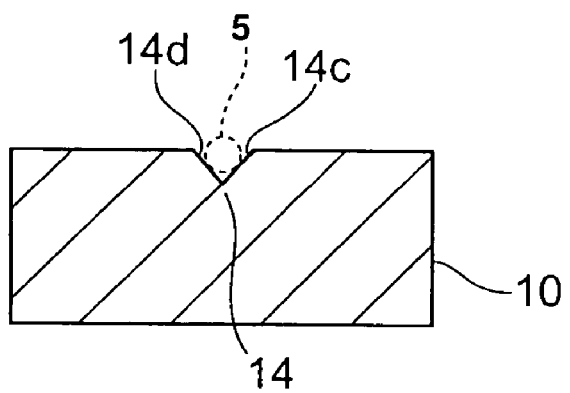
Figure 5:
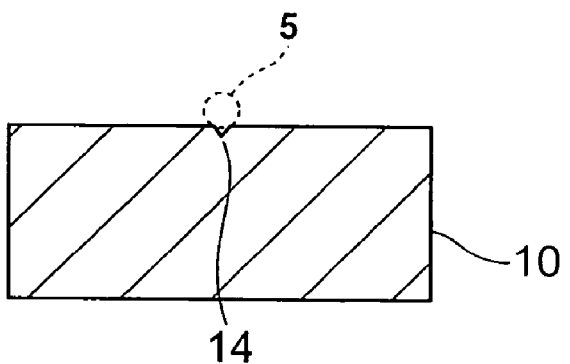
Figure 5:
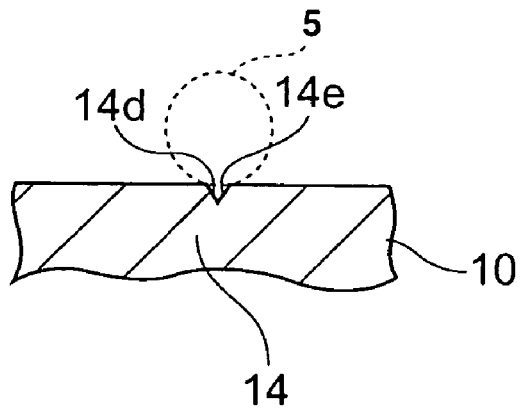

FIG. 4(A) is a plan view showing a modification of the mounting component; FIG. 4(B) is a plan view showing a modification of the optical module; FIG. 4(C) is a sectional view of the optical module taken along the line V'-V' of FIG. 4(B); FIG. 5(A) is a sectional view of a first support groove taken along the line VI-VI of FIG. 4(A); FIG. 5(B) is a sectional view of a second support groove taken along the line VII-VII of FIG. 4(A); FIG. 5(C) is a sectional view of the second support groove taken along the line VIII-VIII of FIG. 4(A); and FIG. 5(D) is an enlarged sectional view of the second support groove shown in FIG. 5(C).

Referring to FIGS. 4(A) and 4(B), an optical module 1a is provided with a mounting component 10 instead of the mounting component 9. The mounting component 10 includes the first support groove 11 and a second support groove 14. The second support groove 14 has a first portion 14a and a second portion 14b.

As shown in FIG. 5(A), in the first support groove 11, the first and second sides 11c and 11d support the ferrule 7. The first portion 14a of the second support groove 14 has first and second sides 14c and 14d. As shown in FIG. 5(B), in the first portion 14a, the first and second sides 14c and 14d support the optical fiber 5. As shown in FIGS. 5(C) and 5(D), in the second portion 14b, the edges of the second support groove 14 support the optical fiber 5. The depth of the second support groove 14 decreases from the one end 14e toward the other end 14f.

Referring to FIG. 4(C), the optical axis of the second portion 5b of the optical fiber 5 extends along the reference axis $A_x$ in the ferrule 7. In the second portion 5b of the optical fiber 5, the space between the reference axis $A_x$ and the optical axis of the first portion 5a of the optical fiber 5 is smaller at a sixth position $P_6$ than at a seventh position $P_7$. On the reference axis Ax, the distance between the sixth position $P_6$ and the one end 13a of the second support groove 13 is smaller than the distance between the seventh position $P_7$ and the one end 13a of the second support groove 13. The first portion 5a of the optical fiber 5 is inclined according to the inclination of the second support groove 14 at an angle 'b' relative to a principal plane 10a of the mounting component 10.

In the optical module 1a, the second portion 5a of the optical fiber 5 extends substantially along a straight line. The second portion 5a of the optical fiber 5 is inclined along the second support groove 14 so as to be settled therein. The angle of such inclination may be in the range of 4° to 12°.

Referring to FIGS. 4(B) and 4(C), the optical module 1a may be further provided with the resin body 17a for fixing the optical fiber 5 to the mounting component 10. In a state in which the optical fiber 5 is settled in the second support groove 14, the optical fiber 5 is fixed to the mounting component 10 with the resin body 17a. The optical module 1a may further include the resin body 17b for fixing the ferrule 7 to the mounting component 10. In a state in which the ferrule 7 is settled in the first support groove 11, the ferrule 7 is fixed to the mounting component 10 with the resin body 17b. The semiconductor optical device 3 is mounted on a first area 10b of a principal plane 10a. The resin body 17a is provided in a second area 10c of the principal plane 10a while the resin body 17b is provided in a third area 10d.

Referring to FIG. 4(A), in the optical module 1a, the space between the first side 14c and the second side 14d is larger at the sixth position $P_6$ than at the seventh position $P_7$. Thereby, in the mounting component 10, the depth of the second support groove 14 changes.

As described above, with the structure of the optical module 1a, the positioning of an optical fiber in a mounting component can be achieved with higher accuracy.

Second Embodiment

Figure 6:
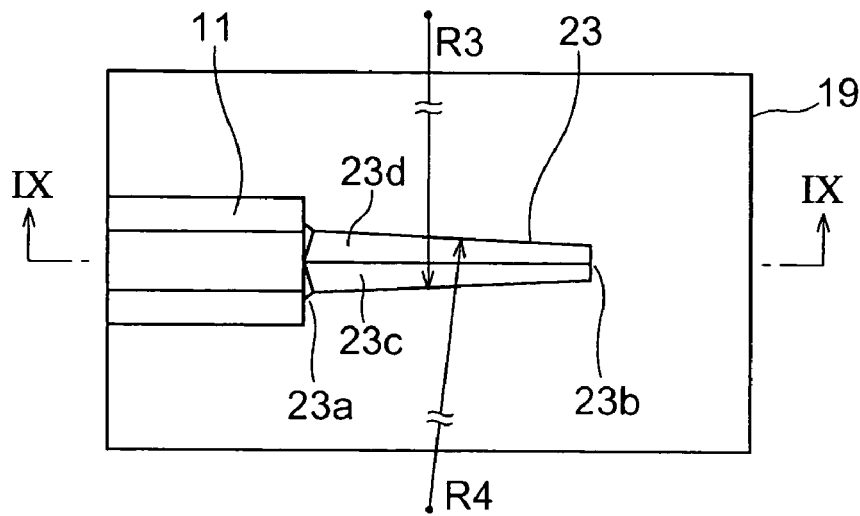
FIG. 6(A) is a plan view of a mounting component according to a second embodiment.
FIG. 6(B) is a sectional view of an optical module taken along the line IX-IX of FIG. 6(A)
FIG. 6(C) is a sectional view of the mounting component taken along the line IX-IX of FIG. 6(A)
Figure 6:
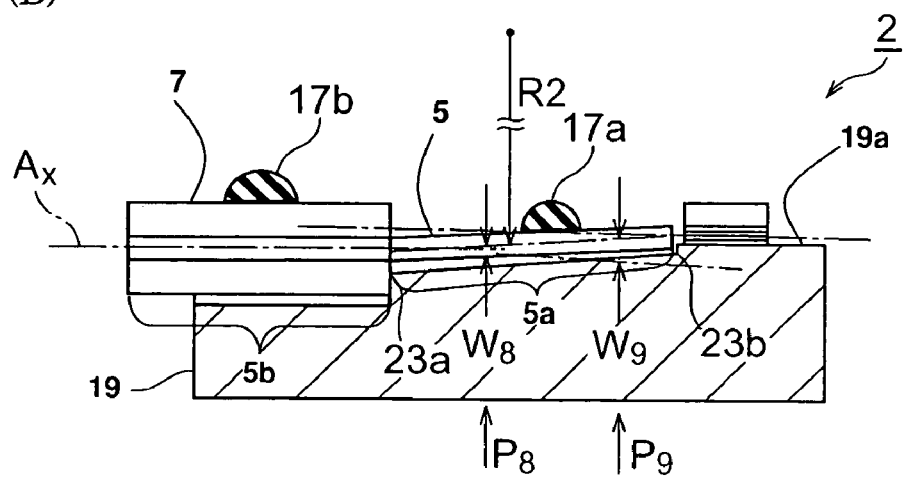
Figure 6:
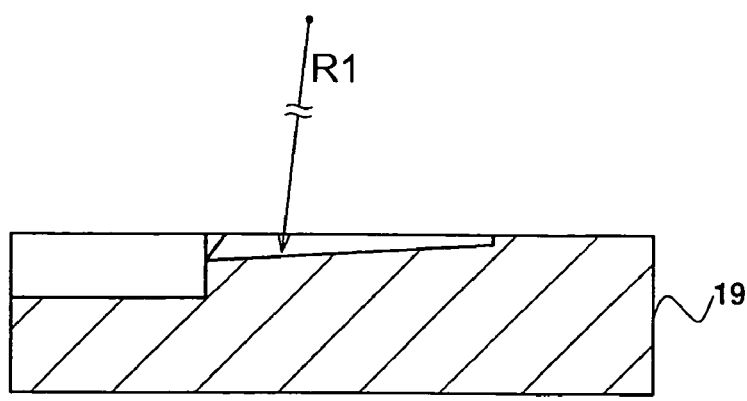
Figure 7:
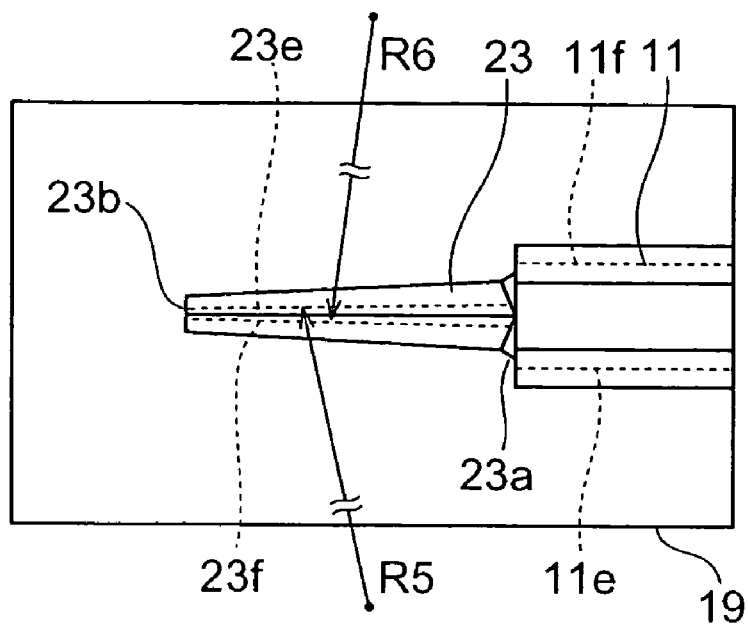
FIG. 7(A) is a plan view of the mounting component.
FIG. 7(B) is a plan view of a modification of the mounting component.
Figure 7:
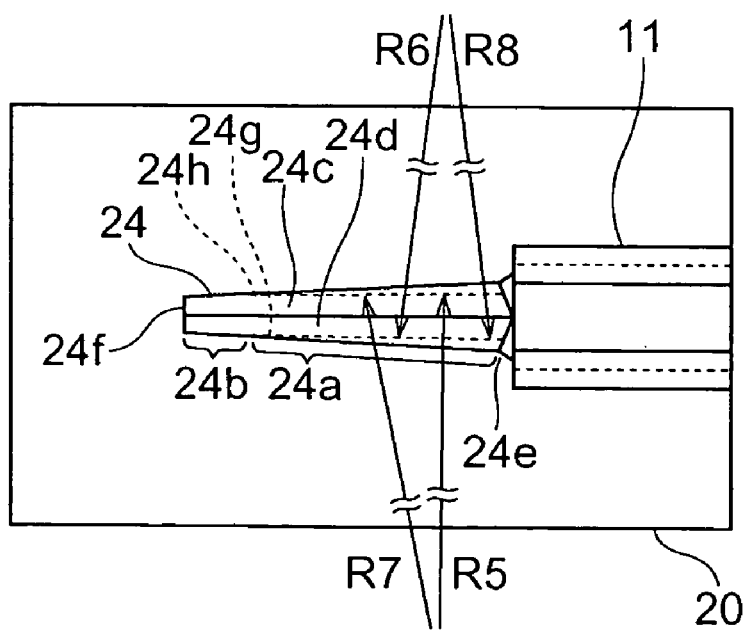

FIG. 6(A) is a plan view of a mounting component according to a second embodiment; FIG. 6(B) is a sectional view of an optical module taken along the line IX-IX of FIG. 6(A); FIG. 6(C) is a sectional view of the mounting component taken along the line IX-IX of FIG. 6(A); FIG. 7(A) is a plan view of the mounting component; and FIG. 7(B) is a plan view showing a modification of the mounting component.

Referring to FIG. 6(A), in an optical module 2, a mounting component 19 includes the first support groove 11 and a second support groove 23. The bottom of the second support groove 23 extends along a convex curve as shown in FIG. 6(C). According to one embodiment, the convex curve can be expressed by a substantially circular arc with a radius of curvature R1.

Referring to FIG. 6(B), the optical axis of the second portion 5b of the optical fiber 5 extends along the reference axis $A_x$ in the ferrule 7. In the first portion 5a of the optical fiber 5, the space $W_8$ at an eighth position $P_8$ between the reference axis $A_x$ and the optical axis of the first portion 5a of the optical fiber 5 is smaller than the space $W_9$ at a ninth position $P_9$ between the reference axis $A_x$ and the optical axis of the first portion 5a of the optical fiber 5. On the reference axis $A_x$, the distance between the eighth position $P_8$ and the one end 23a of the second support groove 23 is smaller than the distance between the ninth position $P_9$ and the one end 23a of the second support groove 23. The first portion 5a of the optical fiber 5 is bent, according to the inclination of the second support groove 23, with a radius of curvature R2 relative to the principal plane 19a of the mounting component 19. When the length of the second support groove 23 is about 4 mm, the radius of curvature is about 30 mm, for example, and preferably within the ranges of 10 mm to 60 mm. If the radius of curvature is less than the above minimum value, the bending of the optical fiber is excessively large. If the radius of curvature exceeds the above maximum value, the advantage of the bending is not afforded to the optical fiber sufficiently.

Referring to FIG. 6(B), the optical module 2 may be further provided with the resin body 17a for fixing the optical fiber 5 to the mounting component 19 while the optical module 2 may further include the resin body 17b for fixing the ferrule 7 to the mounting component 19.

Referring to FIG. 6(A), in the optical module 2, the space between a first side 23c and a second side 23d is larger at the eighth position $P_8$ than at the ninth position $P_9$. Thereby, in the mounting component 19, the depth of the second support groove 23 changes.

The edges of the second support groove 23 are curved in a convex line, and the respective sides 23c and 23d of the second support groove 23 extend along the convex curve. With such structure of the optical module 2, the optical fiber is settled, partly along the convex line, in the second support groove.

According to one embodiment, the side 23c of the second support groove 23 extends along a circular arc with a radius of curvature R3 while the side 23d of the second support groove 23 extends along a circular arc with a radius of curvature R4 (substantially the same as the radius of curvature R3). In the optical module, the optical fiber is settled, partly along a substantially circular arc line, in the second support groove. The depth of the second support groove decreases from the one end 23a toward the other end 23b.

FIG. 7(A) is a plan view of a mounting component. Referring to FIG. 7(A), the second support groove 23 supports the optical fiber 5 with support portions 23e and 23f (indicated by broken lines). The support portions 23e and 23f extend respectively along a convex curve. According to one embodiment, the support portion 23e of the second support groove 23 extends along a circular arc with a radius of curvature R5 while the support portion 23f of the second support groove 23 extends along a circular arc with a radius of curvature R6 (substantially the same as the radius of curvature R5).

As described above, in the optical module 2, an optical fiber can be positioned on a mounting component with higher accuracy.

FIG. 7(B) is a plan view showing a modification of the mounting component. Referring to FIG. 7(B), an optical module 2a using the modified mounting component is provided with a mounting component 20 instead of the mounting component 19. The mounting component 20 includes the first support groove 11 and a second support groove 24. The second support groove 24 includes a first portion 24a and a second portion 24b. The first portion 24a of the second support groove 24 includes first and second sides 24c and 24d. As the embodiment shown in FIG. 5(B), the first portion 24a supports the optical fiber 5 at the first and second sides 24c and 24d. In the second portion 24b, the edges of the second support groove 24 support the optical fiber 5 as in the embodiment shown in FIGS. 5(C) and 5(D). The depth of the second support groove 24 decreases from the one end 24e toward the other end 24f.

The edges of the second support groove 24 are curved in a convex line, and the sides 24c and 24d of the second support groove 24 extend respectively along the convex curve. In the optical module 2a using the modified mounting component, the optical fiber is settled, partly along a convex line, in the second support groove 24. According to one embodiment, the side 24c of the second support groove 24 extends along a circular arc with the radius of curvature R5 while the side 24d of the second support groove 24 extends along a circular arc with the radius of curvature R6 (substantially the same as the radius of curvature R5). In the optical module 2a using the modified mounting component, the optical fiber is settled, partly along a substantially circular arc line, in the second support groove. The depth of the second support groove 24 decreases from the one end 24a toward the other end 24b.

The second support groove 24 supports the optical fiber 5 at support portions 24g and 24h. The support portions 24g and 24h extend respectively along a convex curve. According to one embodiment, the support portion 24g of the second support groove 24 extends along a circular arc with a radius of curvature R7 while the support portion 24h of the second support groove 24 extends along a circular arc with a radius of curvature R8.

As described above, with the optical module 2a using the modified mounting component, the positioning of an optical fiber in a mounting component can be achieved with higher accuracy.

Third Embodiment

Figure 8:
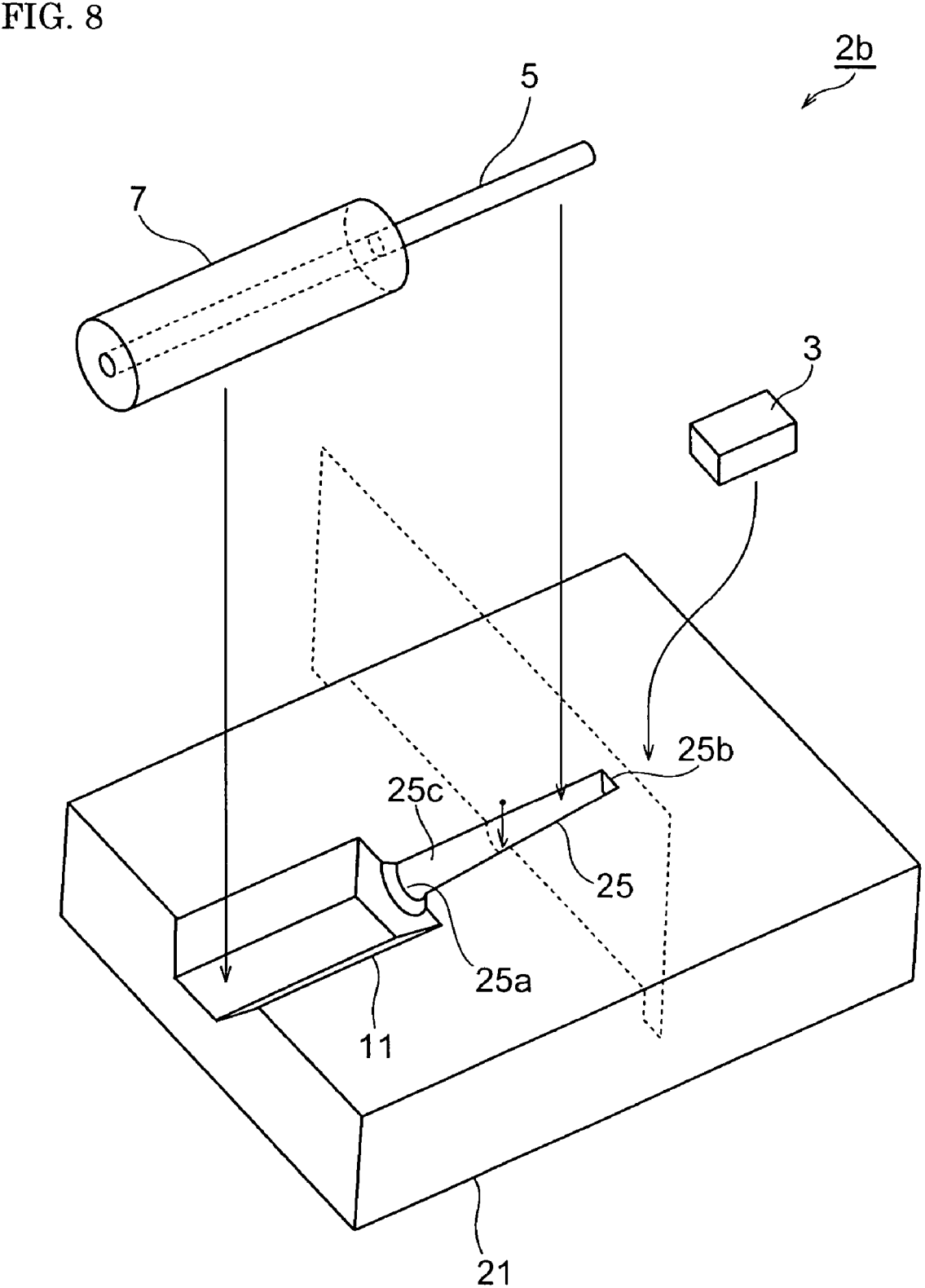
FIG. 8 is a drawing showing components of an optical module according to a third embodiment.
Figure 9:
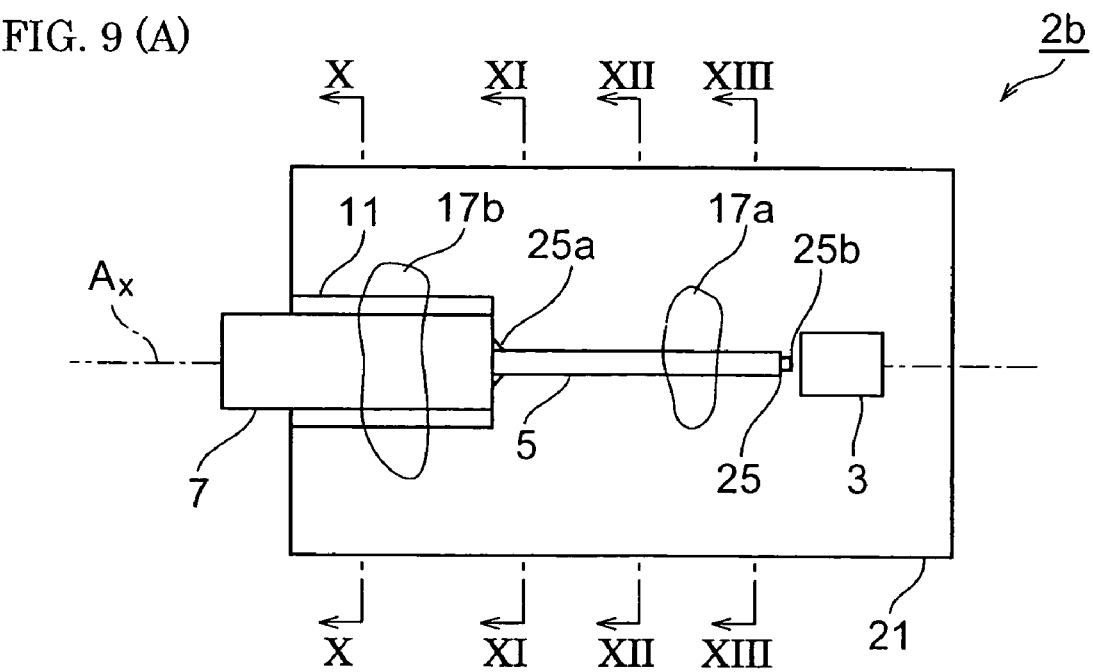
FIG. 9(A) is a plan view of the optical module.
FIG. 9(B) is a sectional view of a first support groove taken along the line X-X of FIG. 9(A)
FIG. 9(C) is a sectional view of the first support groove taken along the line XI-XI of FIG. 9(A)
FIG. 9(D) is a sectional view of a second support groove taken along the line XII-XII of FIG. 9(A)
FIG. 9(E) is a sectional view of the second support groove taken along the line XIII-XIII of FIG. 9(A)
Figure 9:
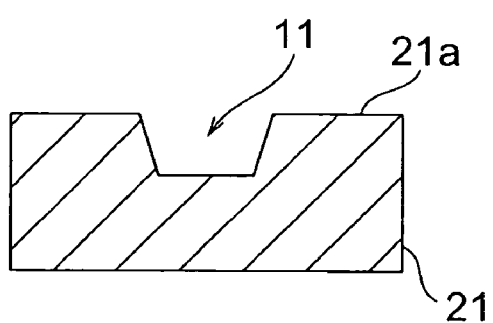
Figure 9:
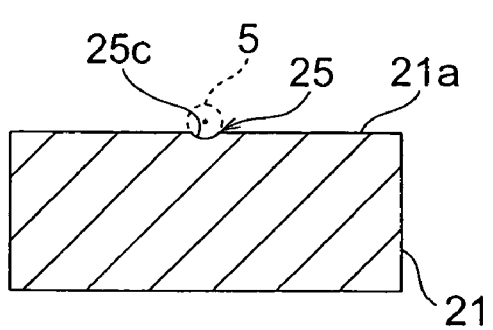
Figure 9:
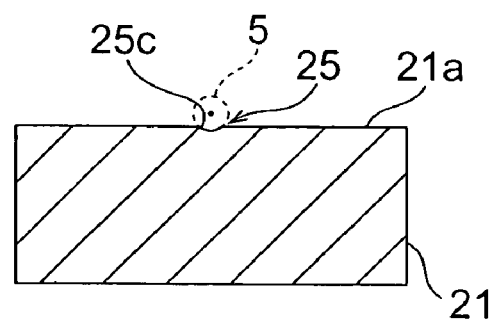
Figure 9:
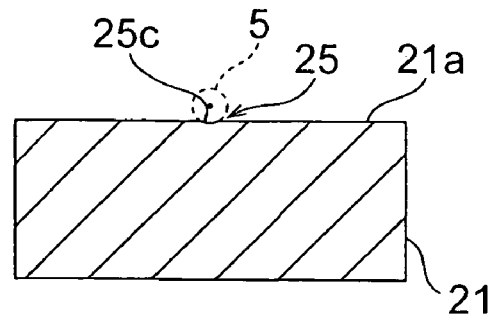

FIG. 8 is a drawing showing components of an optical module according to a third embodiment; FIG. 9(A) is a plan view of the optical module; FIG. 9(B) is a sectional view of a first support groove taken along the line X-X of FIG. 9(A); FIG. 9(C) is a sectional view of a second support groove taken along the line XI-XI of FIG. 9(A); FIG. 9(D) is a sectional view of the second support groove taken along the line XII-XII of FIG. 9(A); and FIG. 9(E) is a sectional view of the second support groove taken along the line XIII-XIII of FIG. 9(A).

Referring to FIG. 8, an optical module 2b includes the semiconductor optical device 3, the optical fiber 5, the ferrule 7, and a mounting component 21. The mounting component 21 includes the first support groove 11 for supporting the ferrule 7 and a second support groove 25 for supporting the optical fiber 5. The mounting component 21 mounts the semiconductor optical device 3 thereon. The first and second support grooves 11 and 25 are arranged in order in the direction of a predetermined axis. The second support groove 25 includes one end 25a and the other end 25b.

Referring to FIG. 9(C) to FIG. 9(E), the second support groove 25 includes the one end 25a and the other end 25b. According to this embodiment, the side wall 25c of the second support groove 25 serves as a support face for supporting the optical fiber 5. The cross-section of the second support groove 25 is defined by a convex curve. According to one embodiment, the cross-section of the second support groove 25 is defined by a circular arc, the radius of curvature of which may be substantially the same as the radius of curvature of the external periphery of the optical fiber 5 or may be slightly larger than that. The depth of the second support groove 25 decreases from the one end 25a toward the other end 25b.

In the optical module 2b, since the depth of the second support groove 25 decreases from the one end 25a toward the other end 25b, the second support groove 25 applies a force to the optical fiber 5 such that the optical fiber 5 is settled in the second support groove 25. By this force, the optical fiber 5 is settled in the second support groove 25. With such structure of the optical module 2b, the optical fiber 5 can be settled in the second support groove 25 without using any fixing member, such as a glass plate, for fixing the optical fiber 5 to the mounting component 21. Thus, since no fixing member is used, the positioning of an optical fiber on the mounting component of an optical module can be achieved with higher accuracy.

Fourth Embodiment

Figure 10:
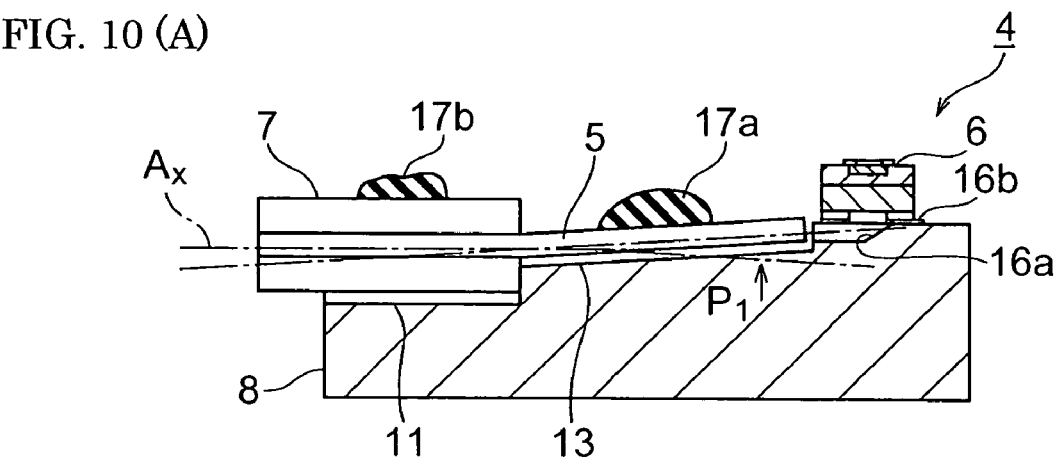
FIGS. 10(A) and 10(B) are drawings showing an optical module according to a fourth embodiment and FIGS. 10(C) and 10(D) are drawings showing a semiconductor light receiving device for the optical module according to the embodiment.
Figure 10:
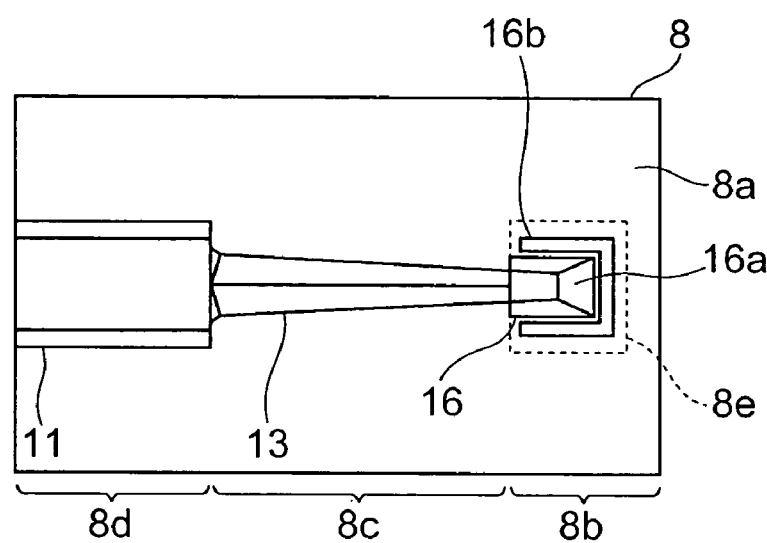
Figure 10:
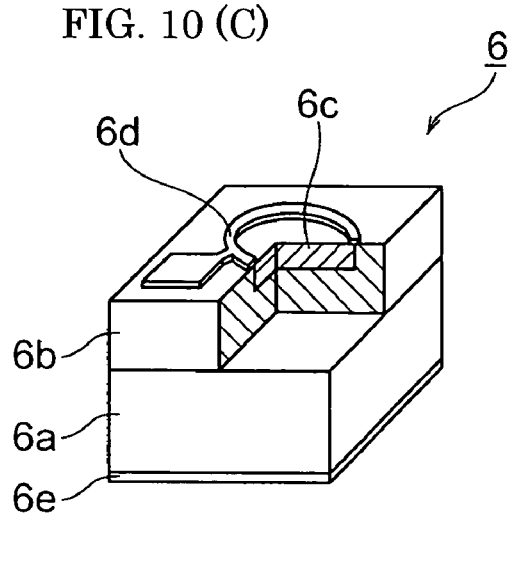
Figure 10:
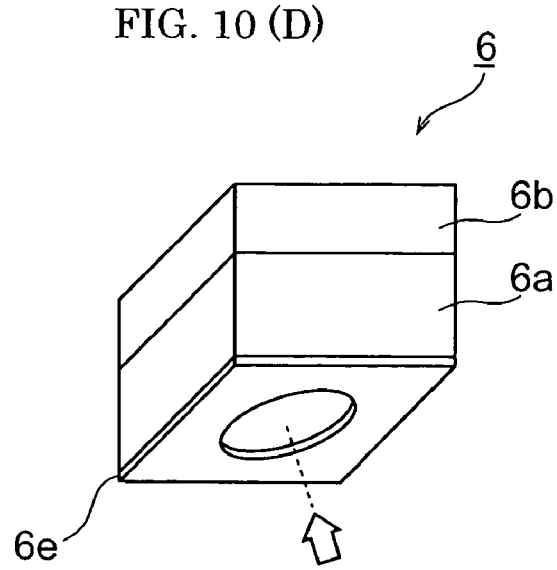

FIGS. 10(A) and 10(B) are drawings of an optical module according to a fourth embodiment; and FIGS. 10(C) and 10(D) are drawings showing a semiconductor optical device for the optical module according to the embodiment.

Referring to FIGS. 10(A) and 10(B), an optical module 4 is provided with a mounting component 8 instead of the mounting component 9. The optical module 4 includes a semiconductor light receiving device 6, the optical fiber 5, the ferrule 7, and the mounting component 8. The optical fiber 5 is optically coupled to the semiconductor light receiving device 6. The ferrule 7 retains the optical fiber 5. The mounting component 8 mounts the semiconductor light receiving device 6 thereon. The mounting component 8 includes the first support groove 11 and the second support groove 13.

As shown in FIGS. 10(C) and 10(D), according to the embodiment, the semiconductor light receiving device 6 is a rear-illuminated type, and includes a substrate 6a such as an InP (indium phosphorous) substrate, one or more semiconductor layers 6b disposed on the substrate 6a, and a P-type semiconductor region 6c provided within the semiconductor layer 6b. The semiconductor light receiving device 6 further includes an anode electrode 6d formed on the upper surface thereof, and a cathode electrode 6e formed on the bottom surface thereof. The semiconductor light receiving device 6 may also include a monolithic lens if required.

Referring to FIG. 10(B), a principal plane 8a of the mounting component 8 includes first to third areas 8b, 8c, and 8d that are provided along a pre-determined axis. The first area 8b of the principal plane 8a includes a mounting region 8e for mounting the semiconductor light receiving device 6. The second support groove 13 is provided in the second area 8c of the principal plane 8a. The first support groove 11 is provided in the third area 8d of the principal plane 8a. In the first area 8b, a groove 16 is formed. At one end of the groove 16, a reflection surface 16a is provided, which is inclined relative to the principal plane 8a. In a preferred embodiment, the reflection surface 16a is plated with gold so as to form a gold plated layer. The mounting component 8 is provided with an electrically conductive pattern 16b aligned with the one end of the groove 16. The conductive pattern 16b is provided for a cathode of the semiconductor light receiving device 6.

The optical fiber 5 is positioned in the second support groove 13, and light from the one end of the optical fiber 5 is reflected on the reflection surface 16a so as to be a reflected ray.

The reflected ray, as shown in FIG. 10(D), passes through an opening of the cathode electrode 6e so as to enter the rear surface of the semiconductor light receiving device 6, which in turn produces a photo-electric current corresponding to the power of the incident light.

In the optical module 4, the depth of the second support groove 13 decreases from one end thereof toward the other end, thereby causing a force to be applied from the second support groove 13 to the optical fiber 5 disposed within the groove. By this force, the optical fiber 5 is securely settled in the second support groove 13. With such structure of the optical module 4, the optical fiber extends along the second support groove 13, without using any fixing member such as a glass plate for fixing the optical fiber 5 to the mounting component. Thus, since no fixing member is used, such optical module is capable of positioning an optical fiber in a mounting component with higher accuracy.

Since the light-receiving diameter of a rear-illuminated type semiconductor light receiving device is large, the optical fiber can be optically coupled to the semiconductor light receiving device even when the optical fiber is curved.

As described above, with the optical module 4, the positioning of an optical fiber in a mounting component can be achieved with higher accuracy.

Fifth Embodiment

Figure 11:
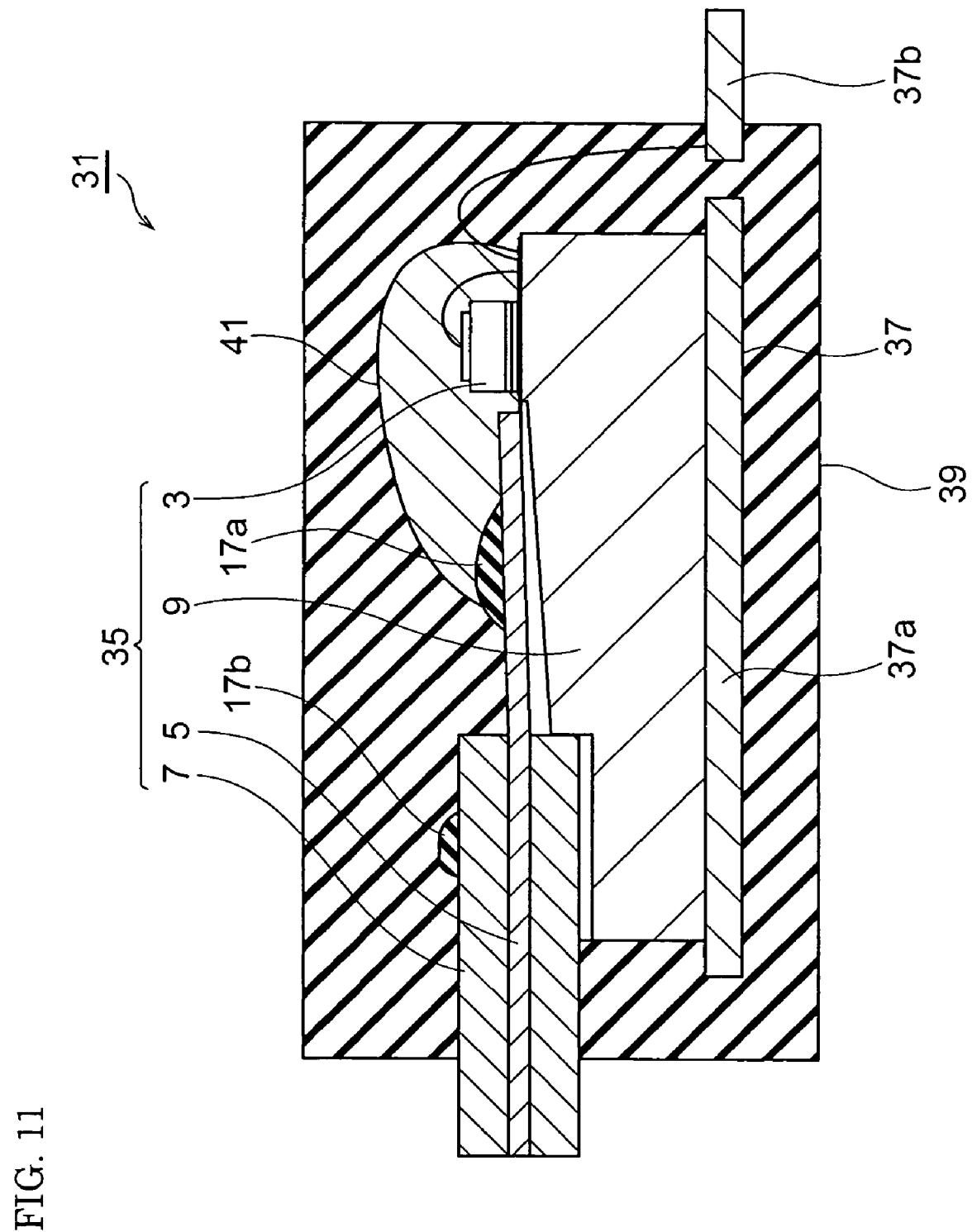
FIG. 11 is a drawing showing an optical module according to a fifth embodiment.

FIG. 11 is a drawing showing an optical module. An optical module 31 includes optical module parts 35, lead terminal parts 37, and a housing 39. Hereinafter, the semiconductor optical device 3, the optical fiber 5, the ferrule 7, and the mounting component 9 are collectively referred to as the optical module parts 35. The optical module parts 35 are configured such that the optical fiber 5 and the ferrule 7 are positioned on the mounting component 9 so that the optical fiber 5 is optically coupled to the semiconductor optical device 3. The optical fiber 5 and the ferrule 7 are fixed to the mounting component 9 by means of the resin bodies 17a and 17b, respectively. The lead terminal parts 37 may be a lead frame, for example, and include an island 37a and a lead terminal 37b. The optical module parts 35 are mounted on the island 37a of the lead terminal parts 37, and provided with a resin body 41 made of a resin that is transparent to light propagating through the optical fiber 5. The resin body 41 is provided so as to cover the semiconductor optical device 3 and one end of the optical fiber 5 such that the optical path between the semiconductor optical device 3 and the optical fiber 5 is arranged in the resin body 41. The housing 39 houses the optical module parts 35 therein.

In the optical module 31, the optical fiber 5 is settled in the second support groove, without using any fixing member, such as a glass plate, for fixing the optical fiber 5 to the mounting component. Thus, in such optical module, since no fixing member is used, positioning of an optical fiber in a mounting component can be achieved with higher accuracy.

Generally, an optical module is required to be low cost. In the optical module 31, since no fixing member, such as a glass plate or a fiber holder, is used, the number of components of the optical module is reduced.

The inventor has found structures which allow reducing the number of components of an optical module as a result of intensive studies for developing a low cost optical module.

The present invention has been described in principle by preferred embodiments with reference to the drawings; however, it is recognizable by those skilled in the art that modifications in arrangements and details can be made without departing from such principle of the present invention. The present invention is not limited to specific structures disclosed in the embodiments. For example, the mounting component is not limited to specific structures described in the embodiments. If required, the mounting component may mount further electronic components thereon. The semiconductor optical device may be not only the semiconductor light emitting device, such as a semiconductor laser, but also the semiconductor light receiving device, such as a photodiode. Accordingly, the right for entire modifications and amendments within the scope of claims and the spirit of the present invention is claimed.

What is claimed is:

1. An optical module comprising:
   a semiconductor optical device;
   an optical fiber optically coupled to the semiconductor optical device;

a ferrule for holding the optical fiber;

a mounting component for mounting the semiconductor optical device and having a first support groove for supporting the ferrule and a second support groove for supporting the optical fiber; and a resin body for fixing the optical fiber to the mounting component;

wherein the mounting component comprises a principal plane extending along a predetermined plane, wherein the first and second support grooves are sequentially arranged in a direction of a predetermined axis, and wherein the first support groove has a predetermined depth on the principal plane, wherein the second support groove has one end and another end, the one end being connected to the first support groove, wherein the second support groove has a depth decreasing from the one end toward the other end, and wherein in the second support groove, the optical fiber has a portion inclined relative to the predetermined plane and extending along a substantially straight line such that an end face of the optical fiber forms an angle in the range of 4° to 12° with an end face of the optical device, the portion of the optical fiber being fixed to the mounting component by the resin body.

2. An optical module according to claim 1, wherein the second support groove comprises first and second sides for supporting the optical fiber and extending in the direction of the predetermined axis, and wherein the optical fiber is supported in a first support portion on the first side while supported in a second support portion on the second side, and wherein the space between the first support portion and the second support portion is smaller at a first position on the predetermined axis than at a second position on the predetermined axis, and the distance between the first position and the one end of the second support groove is greater than the distance between the second position and the one end of the second support groove.

3. An optical module according to claim 1, wherein the mounting component is made of silicon.

4. An optical module according to claim 1, wherein the mounting component is made of ceramics.

5. An optical module according claim 1, wherein the mounting component is made of a resin.

6. An optical module according to claim 1, wherein the semiconductor optical device is either a semiconductor light emitting device or a semiconductor light receiving. device.

7. An optical module according to claim 1, wherein the semiconductor optical device is a rear-illuminated type semiconductor light receiving device, and wherein the mounting component further includes a mounting region for mounting the semiconductor light receiving device, and a reflection face for reflecting light from the optical fiber, the reflection face being provided in the mounting region.

* * * * *